US009296373B2

(12) United States Patent
Futamura et al.

(10) Patent No.: US 9,296,373 B2
(45) Date of Patent: Mar. 29, 2016

(54) VEHICLE TURNING CONTROLLER

(71) Applicant: HONDA MOTOR CO., LTD., Minato-Ku, Tokyo (JP)

(72) Inventors: Tomoyuki Futamura, Wako (JP); Takeshi Kojima, Wako (JP); Kazutaka Ohmura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/174,203

(22) Filed: Feb. 6, 2014

(65) Prior Publication Data
US 2014/0229084 A1 Aug. 14, 2014

(30) Foreign Application Priority Data

Feb. 8, 2013 (JP) ................... 2013-023568

(51) Int. Cl.
B60T 7/12 (2006.01)
B60T 8/1755 (2006.01)
B60T 7/04 (2006.01)

(52) U.S. Cl.
CPC ............... B60T 8/1755 (2013.01); B60T 7/042 (2013.01); B60T 7/12 (2013.01); B60T 2270/304 (2013.01)

(58) Field of Classification Search
None
See application file for complete search history.

(56) References Cited

U.S. PATENT DOCUMENTS 5,864,769 A * 1/1999 Inagaki et al. ................. 701/70
8,024,099 B2 9/2011 Suzuki et al.
8,565,935 B2 * 10/2013 Mizutani et al. ................. 701/1
8,565,993 B2 * 10/2013 Lu et al. ......................... 701/70
2003/0218378 A1 11/2003 Tanaka et al.

(Continued)

FOREIGN PATENT DOCUMENTS

CN 1962326 A 5/2007
DE 10050421 A1 5/2002

(Continued)

OTHER PUBLICATIONS

Search Report issued on Oct. 12, 2015 in connection with German Patent Application No. 10 2014 202 197.9 and English translation.

(Continued)

Primary Examiner — John Q Nguyen
Assistant Examiner — Edward Torchinsky
(74) Attorney, Agent, or Firm — Carrier Blackman & Associates, P.C.; Joseph P. Carrier; Fulchand P. Shende

(57) ABSTRACT

A vehicle turn control system including: a running-condition-information acquisition unit which acquires running-condition information for a vehicle; a brake-manipulation-information acquisition unit which acquires information on manipulation for braking by a driver of the vehicle; and a brake control unit which performs brake control of the vehicle based on the information on manipulation for braking which is acquired by the brake-manipulation-information acquisition unit, and performs brake control for generation of a yaw moment in a body of the vehicle by use of a hydraulic system on the basis of the running-condition information which is acquired by the running-condition-information acquisition unit. The brake control unit imposes a limit on an amount of the brake control for generation of the yaw moment when the brake-manipulation-information acquisition unit acquires the information on manipulation for braking during execution of the brake control for generation of the yaw moment.

2 Claims, 3 Drawing Sheets

(56) References Cited

U.S. PATENT DOCUMENTS

| | | |
|---|---|---|
| 2004/0060765 A1 | 4/2004 | Mattson et al. |
| 2005/0004738 A1 | 1/2005 | Gronau et al. |
| 2012/0109416 A1 | 5/2012 | Mizutani et al. |
| 2014/0229084 A1* | 8/2014 | Futamura et al. ............... 701/70 |

FOREIGN PATENT DOCUMENTS

| | | |
|---|---|---|
| DE | 10130663 A1 | 1/2003 |
| DE | 10340629 A1 | 4/2004 |
| DE | 60304388 T2 | 6/2007 |
| JP | 2005-104348 A | 4/2005 |
| JP | 2005-153716 A | 6/2005 |
| JP | 2010120591 A * | 6/2010 |
| JP | 2010179679 A | 8/2010 |

OTHER PUBLICATIONS

Examination Report issued on Oct. 13, 2015 in connection with German Patent Application No. 10 2014 202 197.9 and English translation.

Office Action issued on Oct. 30, 2015 in connection with Chinese Patent Application No. 2014-10045541.6 and English translation.

* cited by examiner

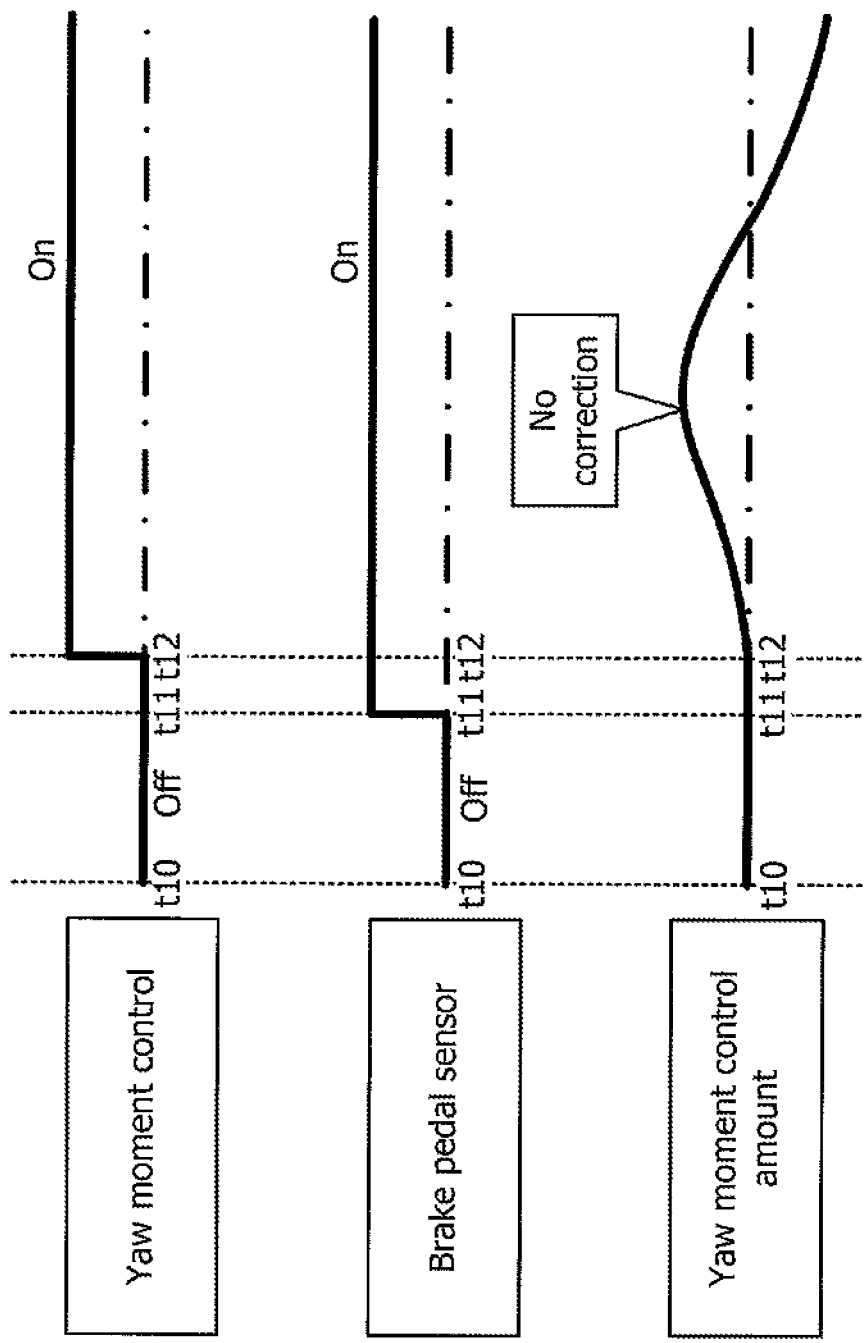

VEHICLE TURNING CONTROLLER

BACKGROUND OF THE INVENTION

1. Field of the Invention

The present invention relates to a vehicle turn control system which performs turn control of a vehicle by yaw moment control.

2. Description of the Related Art

According to a known technique for turn control of a vehicle, the turning of a vehicle is controlled by controlling the yaw moment so as to minimize the deviation of the real yaw rate from the lateral G-derived yaw rate, which is calculated on the basis of the lateral acceleration and the speed of the vehicle.

For example, Japanese Patent Laid-Open No. 2005-153716 (which is hereinafter referred to as JP2005-153716A) discloses a brake control system including a brake control unit, a steering-condition detection unit, and a yaw-moment imparting unit. The brake control unit performs deceleration control of the vehicle in which the brake control system is installed, so as to assist the driver in deceleration in accordance with the intention of the driver. The steering-condition detection unit detects at least one of the steering angular velocity and the steering angular acceleration. While the brake control unit is controlling deceleration of the vehicle, the yaw-moment imparting unit imparts a yaw moment to the vehicle on the basis of the at least one of the steering angular velocity and the steering angular acceleration which is detected by the steering-condition detection unit. The yaw moment imparted by the yaw-moment imparting unit increases with the magnitude of the deceleration of the vehicle controlled by the brake control unit.

The brake operating unit according to JP2005-153716A can appropriately control the yaw moment so as to improve the turnability of the vehicle.

However, in the brake operating unit according to JP2005-153716A, if the driver performs a manipulation for braking while the yaw moment control by use of a hydraulic system is performed, brake control by use of the hydraulic system is also performed on wheels which are not to be subject to the yaw moment control. Therefore, there is a possibility that the driver feels a sense of incongruity (e.g., a rattle of the brake pedal) accompanied by the manipulation for braking.

In view of above, the object of the present invention is to provide a vehicle turn control system which can cause the driver to feel comfortable without feeling a sense of incongruity even when the driver performs a manipulation for braking during yaw moment control.

SUMMARY OF THE INVENTION

In order to achieve the above object, a vehicle turn control system according to the first aspect of the present invention having the following main feature is provided. The vehicle turn control system according to the first aspect of the present invention includes: a running-condition-information acquisition unit which acquires running-condition information for a vehicle, where the running-condition information includes at least one of an amount of steering, a speed of the vehicle, a lateral acceleration, and a yaw rate; a brake-manipulation-information acquisition unit which acquires information on manipulation for braking by a driver of the vehicle; and a brake control unit which performs brake control of the vehicle based on the information on manipulation for braking which is acquired by the brake-manipulation-information acquisition unit, and performs brake control for generation of a yaw moment in a body of the vehicle by use of a hydraulic system on the basis of the running-condition information which is acquired by the running-condition-information acquisition unit. The brake control unit imposes a limit on an amount of the brake control for generation of the yaw moment when the brake-manipulation-information acquisition unit acquires the information on manipulation for braking during execution of the brake control for generation of the yaw moment.

In the situation in which the brake control for generation of a yaw moment by use of the hydraulic system is executed, the wheels of the vehicle are divided into the wheels subject to the brake control and the wheels not subject to the brake control. The brake control for generating the yaw moment by use of the hydraulic system is performed on the wheels subject to the brake control, and no brake control for generation of the yaw moment is performed on the wheels not subject to the brake control. Therefore, high-pressure fluid is lead to the wheels subject to the brake control, and no high-pressure fluid is lead to the wheels not subject to the brake control. Thus, a great pressure difference is generated between the hydraulic system leading to the wheels subject to the brake control and the hydraulic system leading to the wheels not subject to the brake control.

When a manipulation for braking the vehicle by the driver (e.g., depression of the brake pedal) is performed in the above situation, the brake control unit operates to equivalently lead high-pressure fluid to all the wheels. However, the great pressure difference exists between the hydraulic system leading to the wheels subject to the brake control and the hydraulic system leading to the wheels not subject to the brake control. Therefore, in order to quickly make up for the pressure difference, a mechanism for raising hydraulic pressures such as a boosting pump operates at full capacity, so that the pressure rise causes the driver to feel a sense of incongruity (e.g., a rattle of the brake pedal) accompanied by the manipulation for braking.

The vehicle turn control system according to the first aspect of the present invention is configured such that when the brake-manipulation-information acquisition unit acquires information on a manipulation for braking the vehicle by the driver during the yaw moment control, the brake control unit limits the amount of the brake control after the acquisition of the information on the manipulation for braking.

The vehicle turn control system according to the first aspect of the present invention can cause the driver to feel comfortable without feeling a sense of incongruity in a manipulation for braking the vehicle even when the driver performs the manipulation for braking the vehicle during the yaw moment control.

The vehicle turn control system according to the second aspect of the present invention has the following additional feature as well as the feature of the first aspect of the present invention. The additional feature is that when the running-condition-information acquisition unit acquires the running-condition information while the limit is imposed on the brake control for generation of the yaw moment and the acquired running-condition information indicates a change in the turn direction of the vehicle, the brake control unit removes the limit imposed on the brake control for generation of the yaw moment.

The vehicle turn control system according to the second aspect of the present invention can suppress occurrence of the situation in which the driver feels a sense of incongruity accompanied by a manipulation for braking, and appropriately perform the yaw moment control so as to improve the turnability of the vehicle.

The vehicle turn control system according to the third aspect of the present invention has the following additional feature as well as the feature of the first aspect of the present invention. The additional feature is that when the brake control unit starts execution of the brake control for generation of the yaw moment while the brake-manipulation-information acquisition unit is acquiring the information on manipulation for braking, the brake control unit prohibits imposing a limit on the brake control for generation of the yaw moment.

The vehicle turn control system according to the third aspect of the present invention can suppress occurrence of the situation in which the driver feels a sense of incongruity accompanied by a manipulation for braking, and appropriately perform the yaw moment control so as to improve the turnability of the vehicle.

The vehicle turn control system according to the present invention can cause the driver to feel comfortable without feeling a sense of incongruity even when the driver performs a manipulation for braking during yaw moment control.

BRIEF DESCRIPTION OF THE DRAWINGS

FIGS. 3A to 3C are timing diagrams presented for explaining operations of the vehicle turn control system as the embodiment of the present invention, where the FIG. 3A indicates variations of the yaw moment control mode with time, FIG. 3B indicates timings of on and off signals, and FIG. 3C indicates variations of the amount of yaw moment control in correspondence with the yaw moment control mode indicated in FIG. 3A.

DETAILED DESCRIPTION OF THE INVENTION

A vehicle turn control system as an embodiment of the present invention is explained in detail below with reference to the accompanying drawings.

Configuration of Vehicle Turn Control System as Embodiment

First, the configuration of the vehicle turn control system according to the embodiment of the present invention is explained with reference to FIG. 1, which is a function block diagram of the vehicle turn control system according to the embodiment of the present invention.

Figure 1:
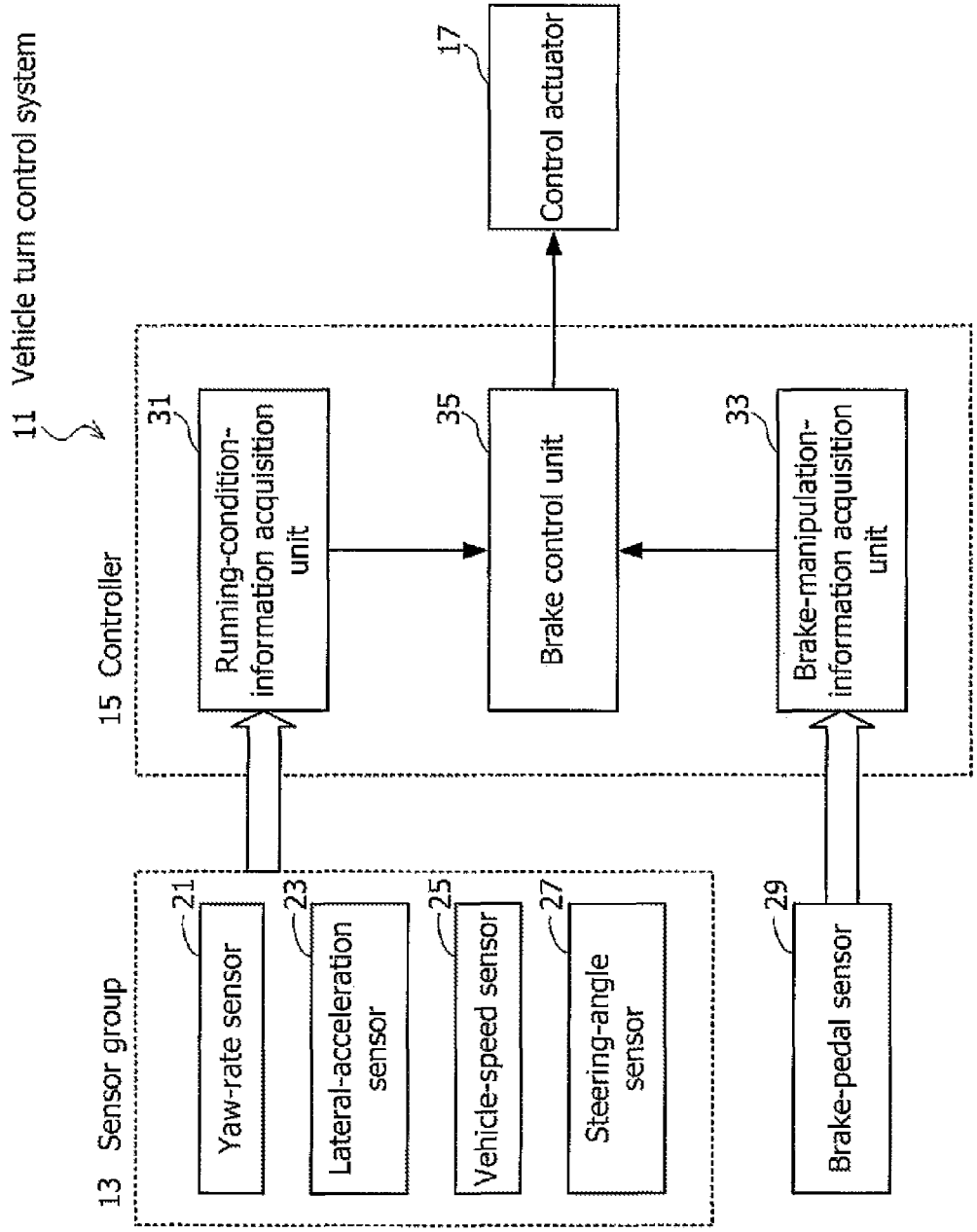
FIG. 1 is a function block diagram of a vehicle turn control system as an embodiment of the present invention.

As illustrated in FIG. 1, the vehicle turn control system 11 according to the embodiment of the present invention is constituted by a sensor group 13, a brake-pedal sensor 29, a controller 15, and a control actuator 17.

As illustrated in FIG. 1, the sensor group 13 includes a yaw-rate sensor 21, a lateral-acceleration sensor 23, a vehicle-speed sensor 25, and a steering-angle sensor 27.

The yaw-rate sensor 21 has a function of detecting the real yaw rate (i.e., the rate of change of the turn angle in the turn direction) of the vehicle (not shown) in which the vehicle turn control system 11 is installed. (Hereinbelow, the vehicle in which the vehicle turn control system 11 is installed is simply referred to as the vehicle.)

The lateral-acceleration sensor 23 has a function of detecting the acceleration (lateral acceleration) which occurs in the lateral direction of the vehicle when the vehicle travels on a curved road.

The vehicle-speed sensor 25 has a function of detecting the speed of the vehicle (which is hereinafter referred to as the vehicle speed).

The steering-angle sensor 27 has a function of detecting the steering angle of the front wheels (not shown), which are steering wheels. In addition, the steering-angle sensor 27 may also have a function of calculating and outputting the steering angular velocity of the steering wheel (not shown) by performing time differentiation of the detected steering angle.

The brake-pedal sensor 29 has a function of detecting the amount of manipulation of the brake pedal (not shown) by the driver. In addition, the brake-pedal sensor 29 may also have a function of calculating and outputting the rate of manipulation of the brake pedal by performing time differentiation of the detected amount of manipulation of the brake pedal.

For example, the controller 15 is built in the ECU (Engine Control Unit), and constituted by a running-condition-information acquisition unit 31, a brake-manipulation-information acquisition unit 33, and a brake control unit 35 as illustrated in FIG. 1. The controller 15 is realized by a microcomputer constituted by a CPU (Central Processing Unit), a ROM (Read Only Memory), and a RAM (Random Access Memory), which are not shown. The microcomputer reads out programs stored in the ROM and performs the programs so as to perform and control operations relating to the functions of acquiring information on the running condition, acquiring information on the brake manipulation, and controlling the brake control function which the controller 15 has.

The running-condition-information acquisition unit 31 has a function of acquiring running-condition information for the vehicle. The running-condition information is information based on which the running condition of the vehicle can be grasped, and includes at least one of the amount of steering, the vehicle speed, the lateral acceleration, and the yaw rate. In addition, the running-condition information may further include the steering angular velocity of the vehicle, the rate of manipulation of the brake pedal, the acceleration in the travelling direction, and other information.

The brake-manipulation-information acquisition unit 33 has a function of acquiring information relating to manipulation for braking by the driver of the vehicle. Specifically, in this example, the information relating to manipulation for braking by the driver of the vehicle is a value detected by the brake-pedal sensor 29.

The brake control unit 35 has a function of controlling braking of the vehicle on the basis of the information relating to manipulation for braking which is acquired by the brake-manipulation-information acquisition unit 33, and further controlling braking of the vehicle for generating a yaw moment in the body of the vehicle by use of a hydraulic system on the basis of the running-condition information acquired by the running-condition-information acquisition unit 31. At this time, the operation of controlling braking of the vehicle for generating a yaw moment in the body of the vehicle by use of a hydraulic system is, for example, to assist the turn motion of the vehicle by controlling hydraulic pressures in a motor cylinder apparatus or a VSA (Vehicle Stability Assist) apparatus (not shown) so as to apply a braking force to wheel(s) to which the braking force is to be applied (e.g., the wheels on the inner side in the turn direction). The motor cylinder apparatus or VSA apparatus is installed in an electromotive servo brake system which brakes the vehicle by use of hydraulic pressures. (VSA is a registered trademark.)

In particular, the brake control unit 35 has a function of limiting the amount of the brake control for generation of a yaw moment, after acquisition of the information relating to manipulation for braking by the driver of the vehicle, when the brake-manipulation-information acquisition unit 33 acquires the information relating to the manipulation for braking by the driver of the vehicle during execution of the brake control for generation of the yaw moment. At this time, the amount of the brake control for generation of the yaw moment is limited below a predetermined amount, which can be set to an appropriate value (including zero) by experiment, simulation, or the like such that the driver does not feel a sense of incongruity (e.g., a rattle of the brake pedal) accompanied by a manipulation for braking.

In addition, the brake control unit 35 has a function of removing the above limitation on the amount of the brake control for generation of the yaw moment when the running-condition-information acquisition unit 31 acquires running-condition information relating to a change in the turn direction of the vehicle during execution of the brake control for generation of the yaw moment. At this time, the removal of the limitation on the amount of the brake control for generation of a yaw moment is to bring the amount of the brake control for generation of the yaw moment to the amount of the original brake control based on the running-condition information on the vehicle.

Furthermore, the brake control unit 35 has a function of prohibiting limitation on the amount of the brake control for generation of a yaw moment when the brake control unit 35 starts execution of the brake control for generation of a yaw moment during acquisition of the information relating to manipulation for braking by the driver of the vehicle. At this time, the prohibition of limitation on the amount of brake control for generation of a yaw moment is to bring the amount of brake control for generation of a yaw moment to the amount of the original brake control based on the running-condition information on the vehicle, as in the case where the running-condition-information acquisition unit 31 acquires running-condition information relating to a change in the turn direction of the vehicle during execution of the brake control for generation of the yaw moment.

A control actuator 17, which actuates mechanical elements provided for applying the braking force to the vehicle, is connected to the brake control unit 35. For example, the motor cylinder apparatus, the VSA apparatus, or the like can be used as the control actuator 17 as appropriate. For example, the brake control unit 35 operates to control the operation of the control actuator 17 such that the real yaw rate detected by the yaw-rate sensor 21 follows a target yaw rate which is set as appropriate by use of a known technique.

Specifically, the brake control unit 35 can perform the brake control of the vehicle based on the information relating to manipulation for braking and the brake control for generation of a yaw moment, for example, by performing the hydraulic pressure control in the motor cylinder apparatus and the VSA apparatus.

In addition, the controller 15 including the brake control unit 35 can be realized by the VSA apparatus, which assists in stabilizing the behavior of the vehicle.

The vehicle turn control system 11 according to the embodiment of the present invention having the above construction includes an operation switch (not shown) which is used for selectively making one of a setting in which the yaw moment control is effective and a setting in which the yaw moment control is ineffective. In the following explanations, it is assumed that the setting in which the yaw moment control is effective is made by the operation switch unless otherwise indicated.

Operation of Vehicle Turn Control System as Embodiment

Hereinbelow, the operation of the vehicle turn control system 11 as the embodiment of the present invention is explained with reference to FIGS. 2A to 3C, which are timing diagrams for explaining the operation of the vehicle turn control system 11.

First, the operations of the vehicle turn control system 11 when a manipulation for braking (an operation of depressing the brake pedal) by the driver is performed during the yaw moment control are explained below with reference to FIGS. 2A to 2C.

Figures 2A, 2B, 2C:
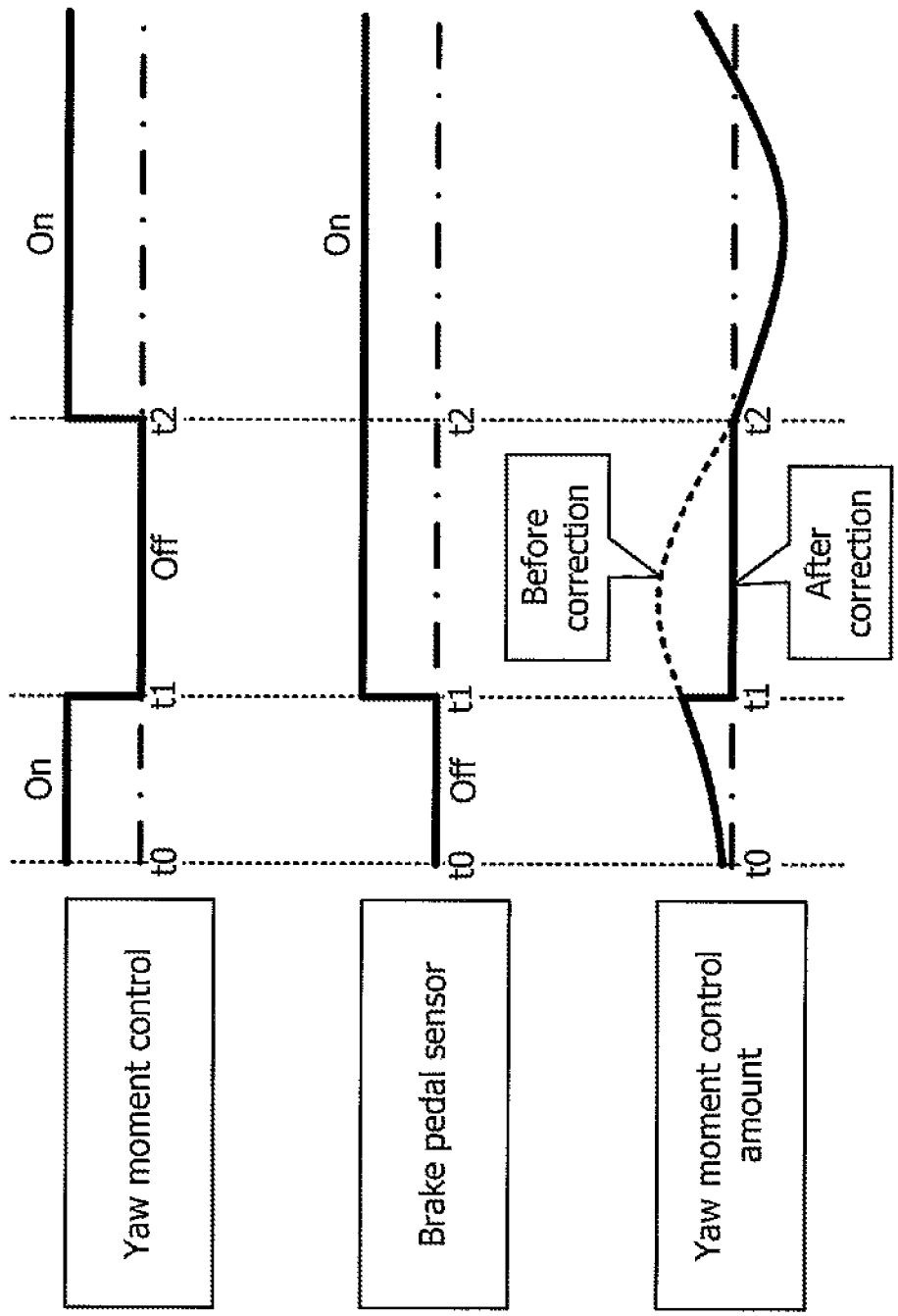
FIGS. 2A to 2C are timing diagrams presented for explaining operations of the vehicle turn control system as the embodiment of the present invention, where FIG. 2A indicates variations of the yaw moment control mode with time, FIG. 2B indicates timings of on and off signals, and FIG. 2C indicates variations of the amount of yaw moment control in correspondence with the yaw moment control mode indicated in FIG. 2A.

As indicated in FIG. 2A (of the on/off setting of the yaw moment control mode), the yaw moment control mode (i.e., the execution condition of the yaw moment control) is set on in the period from t0 to t1. In the present embodiment, the controller 15 is assumed to set the yaw moment control mode on when the deviation of the real yaw rate from the target yaw rate exceeds a predetermined deviation threshold.

In addition, as indicated in FIG. 2B (of the on/off output of the brake-pedal sensor 29), the brake-pedal sensor 29 outputs an off signal in the period from t0 to t1. That is, the brake pedal is not depressed by the driver in the period from t0 to t1.

Further, the amount of the yaw moment control, which is indicated in FIG. 2C, shows a tendency to gradually increase in the period from t0 to t1. In this example, the amount of the yaw moment control is the amount of control in the yaw direction which is given to the brake control unit 35 so as to cancel the deviation of a real locus of motion of the vehicle from an ideal locus of motion of the vehicle, where the deviation can be caused in correspondence with changes in various factors such as the friction coefficient and inclination of the surface of the travel road, the vehicle speed, and the amount of load on the vehicle.

Specifically, the brake control unit 35 operates to assist the turn motion of the vehicle, for example, by controlling hydraulic pressures in the motor cylinder apparatus or the VSA apparatus according to the amount of control in the yaw direction so as to apply braking forces to the relevant wheels (e.g., the wheels on the inner side in the turn direction).

The yaw moment control mode is changed from the on setting to the off setting at time t1 as indicated in FIG. 2A (of the on/off setting of the yaw moment control mode). Thereafter, the off setting of the yaw moment control mode is maintained in the period from t1 to t2.

In addition, the output of the brake-pedal sensor 29 is changed from the off signal to an on signal at time t1 as indicated in FIG. 2B (of the on/off output of the brake-pedal sensor 29). Thereafter, the on signal of the brake-pedal sensor 29 is maintained in the period from t1 to t2. That is, the depression of the brake pedal by the driver is continued in the period from t1 to t2.

Further, the amount of the yaw moment control, which is indicated in FIG. 2C, is corrected, for example, from the positive characteristic values (indicated by the dashed curve) to zero in the period from t1 to t2. In FIG. 2C, the positive characteristic values correspond to the amounts of yaw moment control in the right turn, and the negative characteristic values correspond to the amounts of yaw moment control in the left turn. The above correction from the positive characteristic values to zero is an example of the aforementioned limitation of the amount of brake control according to the present invention.

In addition, the above correction from the positive characteristic values to zero is made because there is a possibility that the driver feels a sense of incongruity (e.g., a rattle of the brake pedal) accompanied by a manipulation for braking immediately after an operation of depressing the brake pedal by the driver starts if the amount of the yaw moment control is still at the positive characteristic values. Specifically, the above sense of incongruity is caused for the following reason. That is, a great pressure difference is produced between the hydraulic pressure routes which lead to the wheels subject to the yaw moment control and the hydraulic pressure routes which lead to the wheels not subject to the yaw moment control, and a mechanism for raising hydraulic pressures such as a boosting pump operates at full capacity for making up for the above pressure difference, so that a reaction force in the direction of returning the brake pedal occurs in the brake pedal.

The yaw moment control mode is changed from the off setting to the on setting at time t2 as indicated in FIG. 2A (of the on/off setting of the yaw moment control mode). After time t2, the on setting of the yaw moment control mode is maintained.

In addition, even after time t2, the output of the on signal from the brake-pedal sensor 29 continues as indicated in FIG. 2B (of the on/off output of the brake-pedal sensor 29). That is, the operation of depressing the brake pedal by the driver is continued even after time t2.

Further, as indicated by the solid curve in FIG. 2C, after time t2, the amount of the yaw moment control takes predetermined characteristic values without the correction. The reason why the amount of the yaw moment control takes predetermined characteristic values without the correction after time t2 (see the solid curve in the FIG. 2C after time t2) is that when the running-condition-information acquisition unit 31 acquires running-condition information relating to a change of the turn direction of the vehicle while the amount of the brake control for generation of a yaw moment is limited (in the period from t1 to t2, in which the amount of the yaw moment control is corrected to zero in the example indicated by FIG. 2C), no reaction force in the direction returning the brake pedal occurs in the brake pedal, and the situation in which the driver feels a sense of incongruity (e.g., a rattle of the brake pedal) accompanied by a manipulation for braking does not occur.

Next, the operations of the vehicle turn control system 11 when a request for yaw moment control occurs in the brake control unit 35 during a manipulation for braking (i.e., during depression of the brake pedal) by the driver are explained below with reference to FIGS. 3A to 3C.

As indicated in FIG. 3A (of the on/off setting of the yaw moment control mode), the yaw moment control mode (i.e., the execution condition of the yaw moment control) is set off in the period from t10 to t11.

In addition, as indicated in FIG. 3B (of the on/off output of the brake-pedal sensor 29), the brake-pedal sensor 29 outputs an off signal in the period from t10 to t11. That is, the brake pedal is not depressed by the driver in the period from t10 to t11.

Further, the amount of the yaw moment control, which is indicated in FIG. 3C, is zero in the period from t10 to t11. That is, no request for yaw moment control occurs in the brake control unit 35 in the period from t10 to t11.

As indicated in FIG. 3A (of the on/off setting of the yaw moment control mode), the off setting of the yaw moment control mode is further continued in the period from t11 to t12.

In addition, the output of the brake-pedal sensor 29 is changed from the off signal to the on signal at time t11 as indicated in FIG. 3B (i.e., the on/off output of the brake-pedal sensor 29). Thereafter, the on signal from the brake-pedal sensor 29 is maintained in the period from t11 to t12. That is, the depression of the brake pedal by the driver is continued for the period from t11 to t12.

Further, as indicated in FIG. 3C, the amount of the yaw moment control is further maintained at zero in the period from t11 to t12. That is, no request for yaw moment control occurs in the brake control unit 35 in the period from t11 to t12.

The yaw moment control mode is changed from the off setting to the on setting at time t12 or later, as indicated in FIG. 3A (of the on/off setting of the yaw moment control mode).

In addition, as indicated in FIG. 3B (of the on/off output of the brake-pedal sensor 29), the output of the on signal from the brake-pedal sensor 29 is further maintained after the period from t11 to t12. That is, the operation of depressing the brake pedal by the driver is continued even after time t12.

Further, as indicated by the solid curve in FIG. 3C, the amount of the yaw moment control takes predetermined characteristic values without correction after time t12. The reason why the amount of the yaw moment control is not corrected after time t12 in the above example is that when a request for yaw moment control in the brake control unit 35 occurs while a manipulation for braking (i.e., depression of the brake pedal) is performed by the driver (as after time t12 in the example of FIGS. 3A to 3C), no reaction force in the direction returning the brake pedal occurs in the brake pedal, and the situation in which the driver feels a sense of incongruity (e.g., a rattle of the brake pedal) accompanied by the manipulation for braking does not occur.

Advantages of Vehicle Turn Control System as Embodiment

Hereinbelow, the advantageous effects of the vehicle turn control system 11 as the embodiment of the present invention are explained below. According to the first aspect of the present invention (corresponding to the appended claim 1), the vehicle turn control system 11 is constituted by the running-condition-information acquisition unit 31, the brake-manipulation-information acquisition unit 33, and the brake control unit 35. As explained before, the running-condition-information acquisition unit 31 acquires the running-condition information for the vehicle, and the running-condition information includes at least one of the amount of steering, the vehicle speed, the lateral acceleration, and the yaw rate. The brake-manipulation-information acquisition unit 33 acquires information relating to the manipulation for braking the vehicle. The brake control unit 35 controls braking of the vehicle on the basis of the information relating to manipulation for braking which is acquired by the brake-manipulation-information acquisition unit 33, and further controls braking of the vehicle for generating a yaw moment in the body of the vehicle by use of a hydraulic system on the basis of the running-condition information acquired by the running-condition-information acquisition unit 31.

In the situation in which the brake control for generation of a yaw moment by use of the hydraulic system is executed, the wheels of the vehicle are divided into the wheels subject to the brake control and the wheels not subject to the brake control. The brake control for generating the yaw moment by use of the hydraulic system is performed on the wheels subject to the brake control, and no brake control for generation of the yaw moment is performed on the wheels not subject to the brake control. Therefore, high-pressure fluid is lead to the wheels subject to the brake control, and no high-pressure fluid is lead to the wheels not subject to the brake control. Thus, a great pressure difference is generated between the hydraulic system leading to the wheels subject to the brake control and the hydraulic system leading to the wheels not subject to the brake control.

When a manipulation for braking the vehicle (e.g., depression of the brake pedal) by the driver is performed in the above situation, the brake control unit 35 operates to equivalently lead high-pressure fluid to all the wheels. However, the great pressure difference exists between the hydraulic routes leading to the wheels subject to the brake control and the hydraulic routes leading to the wheels not subject to the brake control. Therefore, in order to quickly make up for the pressure difference, the mechanism for raising the hydraulic pressures such as a boosting pump operates at full capacity, so that the pressure rise causes the driver to feel a sense of incongruity (e.g., a rattle of the brake pedal) accompanied by the manipulation for braking.

The vehicle turn control system 11 according to the first aspect of the present invention (corresponding to the appended claim 1) is configured such that when the brake-manipulation-information acquisition unit 33 acquires information on a manipulation for braking the vehicle by the driver during the yaw moment control, the brake control unit 35 limits the amount of the brake control after the acquisition of the information on the manipulation for braking.

The vehicle turn control system 11 according to the first aspect of the present invention (corresponding to the appended claim 1) can cause the driver to feel comfortable without feeling a sense of incongruity in a manipulation for braking the vehicle even when the driver performs the manipulation for braking the vehicle during the yaw moment control.

Incidentally, for example, when the running-condition-information acquisition unit 31 acquires running-condition information relating to a change of the turn direction of the vehicle (as in the period from t1 to t2 in FIGS. 2A to 2C) while the amount of the brake control for generation of a yaw moment is limited (e.g., while the amount of the yaw moment control is corrected to zero in the example indicated in FIG. 2C), no reaction force in the direction returning the brake pedal occurs in the brake pedal, and the situation in which the driver feels a sense of incongruity (e.g., a rattle of the brake pedal) accompanied by a manipulation for braking does not occur.

Therefore, the vehicle turn control system 11 according to the second aspect of the present invention (corresponding to the appended claim 2) is configured such that the brake control unit 35 removes the limitation of the amount of the brake control when the running-condition-information acquisition unit 31 acquires running-condition information relating to a change of the turn direction of the vehicle while the amount of the brake control is limited.

The vehicle turn control system 11 according to the second aspect of the present invention (corresponding to the appended claim 2) can suppress occurrence of the situation in which the driver feels a sense of incongruity accompanied by a manipulation for braking, and appropriately perform the yaw moment control so as to improve the turnability of the vehicle.

Further, for example, when a request for yaw moment control occurs in the brake control unit 35 (at time t12 or later in FIGS. 3A to 3C) during execution of the brake control (e.g., depression of the brake pedal) by the driver, no reaction force in the direction returning the brake pedal occurs in the brake pedal, and the situation in which the driver feels a sense of incongruity (e.g., a rattle of the brake pedal) accompanied by a manipulation for braking does not occur.

Therefore, the vehicle turn control system 11 according to the third aspect of the present invention (corresponding to the appended claim 3) is configured such that the brake control unit 35 prohibits limitation of the amount of brake control when the brake control unit 35 starts execution of the brake control for generation of a yaw moment while the brake-manipulation-information acquisition unit 33 is acquiring information relating to manipulation for braking.

The vehicle turn control system 11 according to the third aspect of the present invention (corresponding to the appended claim 3) can suppress occurrence of the situation in which the driver feels a sense of incongruity accompanied by a manipulation for braking, and appropriately perform the yaw moment control so as to improve the turnability of the vehicle.

Other Embodiments

The embodiment explained above is a concrete example of the present invention. Therefore, the technical scope of the present invention should not be interpreted restrictively by the explained embodiment, because the present invention can be implemented in various manners without departing from the gist or the main feature of the present invention.

In the explained embodiment of the present invention in which the amount of the brake control is limited, the amount of the yaw moment control is corrected from the positive characteristic values to zero. However, the present invention is not limited to the above manner of limitation. For example, in another embodiment in which the amount of the brake control is limited and which is included in the technical scope of the present invention, the amount of the brake control is reduced from the amount of the original brake control.

In addition, the brake control unit 35 in the explained embodiment of the present invention operates to assist the turn motion of the vehicle by controlling hydraulic pressures in the motor cylinder apparatus or the VSA apparatus according to the amount of control in the yaw direction so as to apply braking forces to the relevant wheels. However, the present invention is not limited to the above brake control unit 35. For example, in another embodiment in which braking forces are applied to the relevant wheels and which is included in the technical scope of the present invention, hydraulic pressures in a hydraulic-pressure generation unit realized by a combination of motors, pumps, and accumulators are controlled according to the amount of control in the yaw direction.

Further, in the explained embodiment, the brake-pedal sensor 29 is indicated as an example of a means for acquiring the information relating to manipulation for braking by the driver. However, the present invention is not limited to the above brake-pedal sensor 29. For example, a stroke sensor or a hydraulic-pressure sensor which detects the hydraulic pressure in the master cylinder may be used as the means for acquiring the information relating to manipulation for braking by the driver. In particular, from the viewpoint of improvement in the accuracy of detection of manipulation for braking, it is possible to detect whether or not a manipulation for braking is performed, on the basis of a result of a comparison between current and previous ones of a series of values of the amount of manipulation for braking which are periodically acquired.

Furthermore, the yaw moment control according to the present invention may include feedforward control using a map which contains the steering angle and the friction coefficient of the road surface as control parameters. (For example, see Japanese Patent Laid-Open No. 2011-183826.) In this case, the present invention can be effectively applied to an embodiment in which yaw moment control is performed in a feedforward manner in advance of the manipulation for braking.

What is claimed is:

1. A vehicle turning controller comprising:
   a running-condition-information acquisition unit which acquires running-condition information for a vehicle, where the running-condition information includes at least one of an amount of steering, a speed of the vehicle, a lateral acceleration, and a yaw rate;
   a brake-manipulation-information acquisition unit which acquires information on manipulation for brake pedal by a driver of the vehicle; and
   a brake control unit which performs brake control of the vehicle based on the information on manipulation for braking which is acquired by the brake-manipulation-information acquisition unit, and further performs brake control for generation of a yaw moment in a body of the vehicle by use of a hydraulic system on the basis of the running-condition information which is acquired by the running-condition-information acquisition unit;
   wherein the brake control unit imposes a limit on an amount of the brake control when the brake-manipulation-information acquisition unit acquires the information on manipulation for braking including depression of the brake pedal by the driver of the vehicle during execution of the brake control for generation of the yaw moment below a predetermined amount so as to minimize rattle of the brake pedal; and
   wherein when the brake control unit starts execution of the brake control for generation of the yaw moment while the brake-manipulation-information acquisition unit is acquiring the information on manipulation for braking, the brake control unit prohibits imposing a limit on the brake control for generation of the yaw moment.

2. The vehicle turning controller according to claim 1, wherein when the running-condition-information acquisition unit acquires the running-condition information while the limit is imposed on the brake control and the acquired running-condition information indicates a change in a turn direction of the vehicle, the brake control unit removes the limit imposed on the brake control.

* * * * *